(12) United States Patent
Baldie (10) Patent No.: US 12,260,388 B2
(45) Date of Patent: *Mar. 25, 2025

(54) SYSTEM AND METHOD FOR PROVIDING A BLUETOOTH LOW ENERGY MOBILE PAYMENT SYSTEM

(71) Applicant: American Express Travel Related Services Company, Inc., New York, NY (US)

(72) Inventor: David Baldie, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,556

(22) Filed: Dec. 26, 2023

(65) Prior Publication Data

US 2024/0185218 A1 Jun. 6, 2024

Related U.S. Application Data

(63) Continuation of application No. 17/322,281, filed on May 17, 2021, now Pat. No. 11,893,567, which is a continuation of application No. 16/109,046, filed on Aug. 22, 2018, now Pat. No. 11,010,748, which is a continuation of application No. 14/469,230, filed on Aug. 26, 2014, now Pat. No. 10,062,073.

(51) Int. Cl.
G06Q 20/32 (2012.01)
G06Q 20/40 (2012.01)
H04W 48/12 (2009.01)

(52) U.S. Cl.
CPC ....... *G06Q 20/327* (2013.01); *G06Q 20/3224* (2013.01); *G06Q 20/40* (2013.01); *H04W 48/12* (2013.01)

(58) Field of Classification Search
None
See application file for complete search history.

(56) References Cited

U.S. PATENT DOCUMENTS

| 7,543,738 | B1 | 6/2009 | Saunders et al. |
| 9,326,226 | B2* | 4/2016 | Bahram Pour ......... H04W 4/02 |
| 9,996,831 | B2* | 6/2018 | Dixon ................. G06Q 20/145 |
| 11,030,599 | B2 | 6/2021 | Fernandez et al. |
| 11,037,129 | B1 | 6/2021 | Chen et al. |
| 2008/0109317 | A1* | 5/2008 | Singh ................. G06Q 30/0254 |
| | | | 705/14.5 |
| 2009/0171853 | A1* | 7/2009 | Georgiou ............... G06Q 30/08 |
| | | | 705/80 |

(Continued)

FOREIGN PATENT DOCUMENTS

WO WO-2014176172 A2 * 10/2014 ........... G06Q 20/227

*Primary Examiner* — Christopher Bridges (57) ABSTRACT

A BLUETOOTH low energy mobile payments system may comprise a BLE beacon that is deployed at a merchant location. The BLE beacon may be associated with a specific merchant terminal. The BLE beacon may be configured to broadcast a unique beacon ID that is detectable by a user device. The user device may be configured to communicate the beacon ID to a payment system. In response to receiving the beacon ID, the user device may initiate a payment between a user and a merchant, via a user device and a merchant terminal.

20 Claims, 3 Drawing Sheets

(56) References Cited

U.S. PATENT DOCUMENTS

| | | | |
|---|---|---|---|
| 2010/0131347 A1* | 5/2010 | Sartipi | G06Q 20/40 |
| | | | 705/17 |
| 2010/0320266 A1* | 12/2010 | White | G06Q 20/3278 |
| | | | 235/375 |
| 2012/0233158 A1* | 9/2012 | Braginsky | G06F 16/24578 |
| | | | 707/723 |
| 2013/0251216 A1* | 9/2013 | Smowton | G06V 40/67 |
| | | | 713/150 |
| 2014/0108108 A1 | 4/2014 | Artman et al. | |
| 2014/0188733 A1* | 7/2014 | Granbery | G06Q 20/3226 |
| | | | 705/64 |
| 2015/0073980 A1* | 3/2015 | Griffin | G06F 21/35 |
| | | | 705/39 |
| 2015/0140982 A1* | 5/2015 | Postrel | H04W 4/12 |
| | | | 455/418 |
| 2015/0332240 A1* | 11/2015 | Harwood | G06Q 20/3224 |
| | | | 705/21 |
| 2015/0379650 A1* | 12/2015 | Theobald | H04W 4/80 |
| | | | 705/15 |

* cited by examiner

SYSTEM AND METHOD FOR PROVIDING A BLUETOOTH LOW ENERGY MOBILE PAYMENT SYSTEM

CROSS REFERENCE TO RELATED APPLICATIONS

This application is a continuation of, claims priority to and the benefit of, U.S. Ser. No. 17/322,281, filed May 17, 2021, entitled "SYSTEM AND METHOD FOR PROVIDING A BLUETOOTH LOW ENERGY MOBILE PAYMENT SYSTEM," which is a continuation of U.S. Pat. No. 11,010,748, issued May 18, 2021 and filed Aug. 22, 2018, entitled "TRANSACTIONS USING A BLUETOOTH LOW ENERGY BEACON," which is a continuation of U.S. Pat. No. 10,062,073, issued Aug. 28, 2018 and filed Aug. 26, 2014, entitled "SYSTEM AND METHOD FOR PROVIDING A BLUETOOTH LOW ENERGY MOBILE PAYMENT SYSTEM," the contents of which are incorporated herein by reference in their entirety for all purposes.

FIELD

The present disclosure relates to facilitating mobile payments, and more specifically, to systems and methods for creating a mobile payment system using BLUETOOTH low energy beacons.

BACKGROUND

Payment processing, point of sale devices, and payment capture systems are evolving. Some recent payment acquisition technologies have used near field communication, which includes communication protocols that allow user devices (e.g., smartphones and tablets) with appropriate communication equipment to communicate with point of sale devices. However, not all smartphones are equipped with NFC communication capabilities such as, for example, the iPhone®. Moreover, NFC communication protocols require a tap or bump by the smartphone to the point of sale device making it inconvenient for some users.

SUMMARY

A system, method, and computer readable medium (collectively, the "System") for facilitating wireless payments may comprise operations and/or steps performed by a computer based system including: receiving a beacon identifier associated with a Bluetooth low energy ("BLE") beacon, and a customer identifier from a user device. The user device may be within a defined distance from the BLE beacon. The System may also include transmitting, to the user device, merchant information associated with the BLE beacon. The system may also include transmitting, to a merchant terminal, a request to make a payment from a user associated with the user device, and an image of the user. The System may include initiating a transaction based on transaction information received from a merchant. The transaction information may include a preliminary transaction amount. The System may also include receiving, from the user device, a user confirmation to authorize the transaction and a transaction amount.

In various embodiments, the transaction amount may be the preliminary transaction amount as modified by the user. The transaction information may include item information. The BLE beacon may be connected to a micro-registry.

In various embodiments, the user device may comprise an application. The application may be configured to recognize the BLE beacon and to create instructions for the request to make a payment. The BLE beacon may be detected by the user device. In response to the user device detecting the BLE beacon, the application may be automatically initiated. The system may also include receiving a merchant confirmation to confirm the transaction and the transaction amount.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
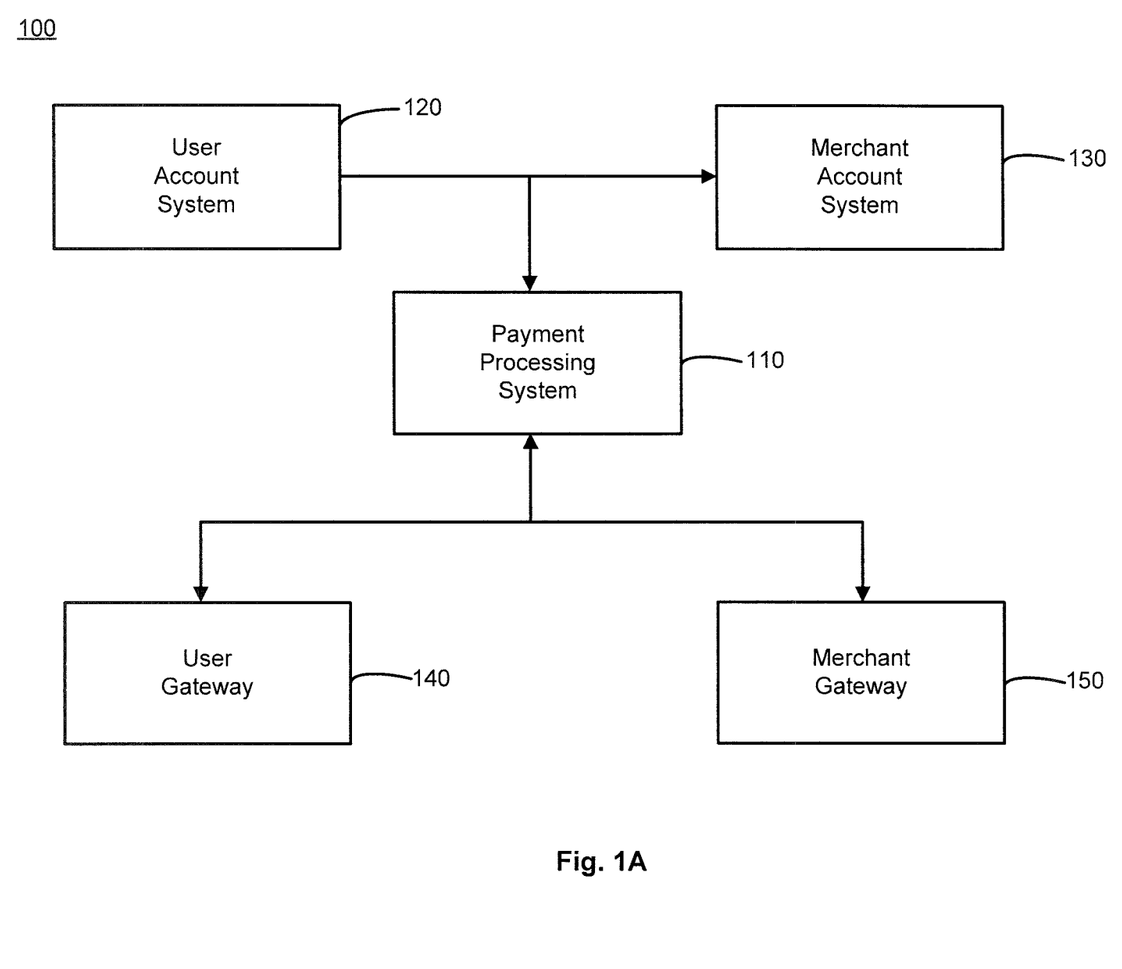
FIG. 1A illustrates various exemplary modules and/or components for a payment system, in accordance with various embodiments.

In various embodiments, and with reference to FIG. 1A, a payment system 100 may comprise a payment processing module 110, a user account system 120, and a merchant account system 130. Payment processing module 110 may be configured to receive requests, and/or initiate transactions between users and merchants. Payment processing module 110 may process, analyze, and/or otherwise execute the transactions causing monetary value to be transferred from the user to the merchant. Payment processing module 110 may be operatively coupled to and in electronic communication with user account system 120. User account system 120 may be any suitable system configured to manage user accounts. In this regard, user account system 120 may be any suitable bank, credit card or transaction account provider, and/or the like. User account system 120 may also be a portion of a stored value transaction account system. Merchant account system 130 may be any system (or portion of any system) that is configured to manage merchant transaction accounts. In this regard, merchant account system 130 may be configured to receive funds, money, credit and/or the like from user account system 120, in response to payment processing module 110 receiving transaction information.

In various embodiments, system 100 may further comprise a user gateway 140 and/or a merchant gateway 150. User gateway 140 may be configured to provide access for a user to payment processing module 110. Similarly, merchant gateway 150 may be configured to provide access for a merchant to payment processing module 110.

Figure 1B:
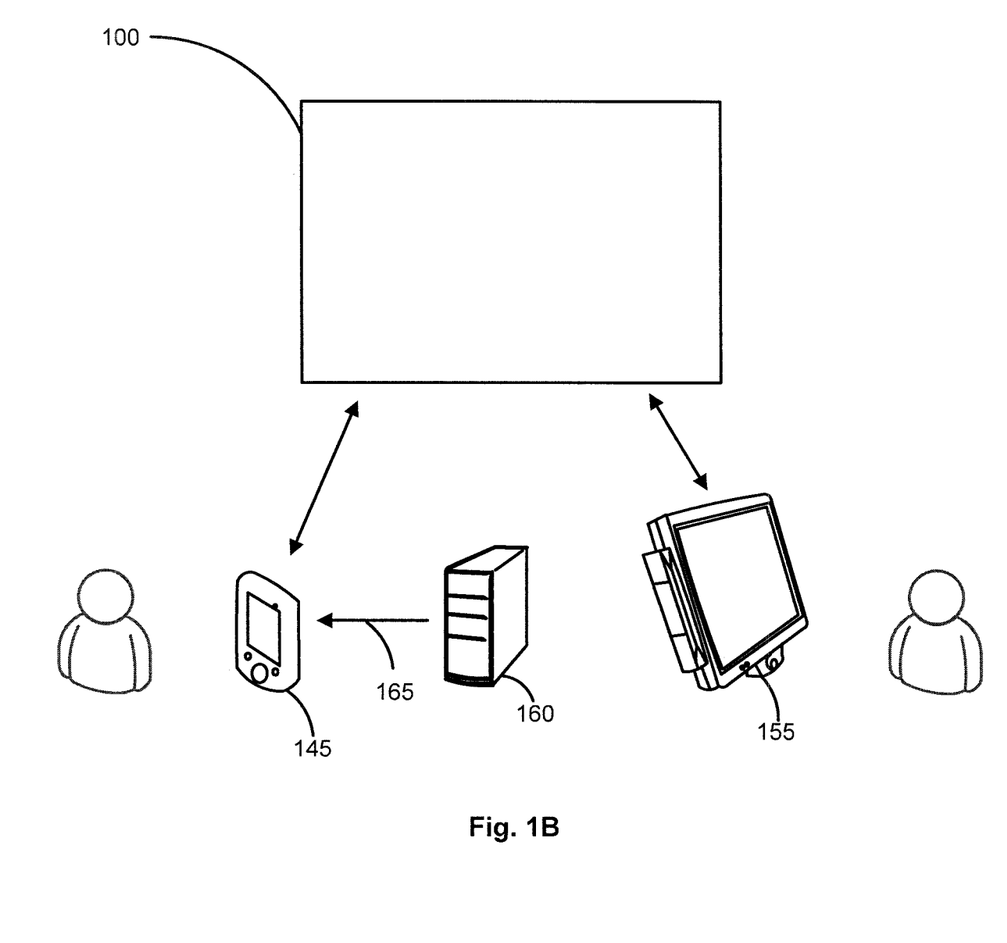
FIG. 1B illustrates a BLUETOOTH low energy mobile payment system deployed at a merchant location with an associated merchant terminal, in accordance with various embodiments.

In various embodiments, and with reference to FIG. 1A and FIG. 1B, a merchant may provide and/or deploy a beacon 160. The beacon may be deployed at or near a merchant terminal 155. The beacon may be configured to broadcast a unique beacon identifier ("ID"). The beacon ID may be stored in system 100. Moreover, the beacon ID may be associated with a specific merchant, a specific merchant terminal 155, a particular merchant location, and/or the like. User device 145 may be configured to detect, monitor, and/or receive a transmission from BLE beacon 160. Transmission 165 may include the beacon ID. Examples of using BLE beacons, proximity based communications and dynamic proximity based e-commerce transactions, along with additional features and functions may be found in, for example, U.S. patent application Ser. No. 14/339,284 filed on Jul. 23, 2014 and entitled "SYSTEMS AND METHODS FOR PROXIMITY BASED COMMUNICATION" and U.S. patent application Ser. No. 14/284,817 filed on May 22, 2014 and entitled "SYSTEMS AND METHODS FOR DYNAMIC PROXIMITY BASED E-COMMERCE TRANSACTIONS", which are hereby incorporated by reference in their entirety for any purpose.

In various embodiments, the beacon ID may comprise a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers. The unique combinations of major numbers and minor number may be assigned to BLE beacons and/or associated locations. As such, the identifier received by the user device and provided to the micro registry may be associated with a particular micro-location.

As used herein, a "micro-location" of a user may comprise a location of a user in relation to any energy consuming device. For example, the energy consuming device may comprise a high, medium, and/or low energy consuming device and/or any combination thereof. For example, the energy consuming device may be a low power and/or low energy consuming device. Such a device may be a BLUETOOTH device, such as a wireless beacon communicating using a low power or low energy BLUETOOTH communication standard (a "BLUETOOTH low energy beacon" or simply, a "BLE beacon"). However, in various embodiments, any type of low energy consuming device may be implemented with the systems described herein. For example, in various embodiments, any device (including any other BLE beacon) capable of communicating with a web-client and/or any other BLE beacon within three hundred meters of a BLE beacon may comprise a low energy consuming device. Thus, although the phrase "BLE beacon" is used herein with particular respect to a BLUETOOTH low energy consuming device, a BLE beacon may comprise any energy consuming device capable of communication with a web-client. In various embodiments, the low energy consuming device may capable of communication with a web-client to within approximately three hundred meters or less—that is, any device capable of communicating with a web-client within a micro-location of the web-client. As described above, a low energy consuming device (e.g., BLE beacon 150) may comprise any device capable of transmitting and/or receiving a signal wirelessly using a low power or low energy connection to a network. In various embodiments, such a signal may comprise a BLUETOOTH signal. A BLUETOOTH signal may comprise and/or utilize one or more internet protocol ("IP") session connections. The IP session connections may enable a variety of piconet communication technologies. In various embodiments, particularly with regard IP version 6, a cryptographic key exchange protocol (symmetric and/or asymmetric) may be implemented. For example, a key management device may utilize IEEE Standard 1363.1-2013 for identity based cryptographic techniques that utilize pairings such that an encryption key may comprise one or more plain text strings (such as one or more email addresses).

Although the term "BLE beacon" is used herein in association with a BLUETOOTH communication protocol and/or signal, the phrase may refer to any communication protocol and/or any other "low energy" signal. As used herein, a "low energy signal" may comprise any signal capable of being received by a web-client within a range of approximately three hundred meters or less. In various embodiments, a BLE beacon may enable the discovery of a micro-location of a user. A micro-location may comprise any location of the user within, for example, user within a defined distance such as, within any suitable distance such as, for example, 10 meters to 10 centimeters of a BLE beacon.

The BLE beacons may be deployed in various physical locations including, for example, brick and mortar merchant locations. A merchant may use a third party service host to facilitate interactions between the merchant and the user. In this regard, the micro registry may help merchants engage users seamlessly, without regard to the service host employed by the merchant, because the service host will be seamlessly and instantly accessible through the micro registry. Moreover, the micro registry may reduce fragmentation of mobile and/or geo-location services.

As e-commerce and digital activities grow and the boundaries of the virtual marketplace and virtual world disappear, consumers are looking for ways to more easily conduct transactions, connect with merchants, obtain information about items, initiate transactions to make purchases, receive rewards, reverse items and/or the like. Providing a network that facilitates interactions between various service hosts, merchants, loyalty programs, acquirers, transaction account issuers, points of sale, payment services and/or the like allows the user to seamlessly connect with the merchant. This network also minimizes and/or eliminates the fragmentation that may occur, where service hosts are not accessible on the same network.

Phrases and terms similar to "business," "service host" or "merchant" may be used interchangeably with each other and shall mean any person, entity, distributor system, software and/or hardware that is a provider, broker and/or any other entity in the distribution chain of goods or services. In this regard, the "business," "service host" or "merchant" may facilitate a real world or virtual interaction, transaction, exchange of information between a supplier of an item and a user. This interaction or transaction may be trigger by a service request from a user in a micro registry. In various embodiments, user device 145 may comprise a merchant application. The merchant application may be any suitable application configured to complete a payment with the merchant. User device 145 may also be configured to automatically detect transmission 165 from BLE beacon 160. In response to detecting transmission 165, user device 145 may automatically launch the merchant application.

Figure 2:
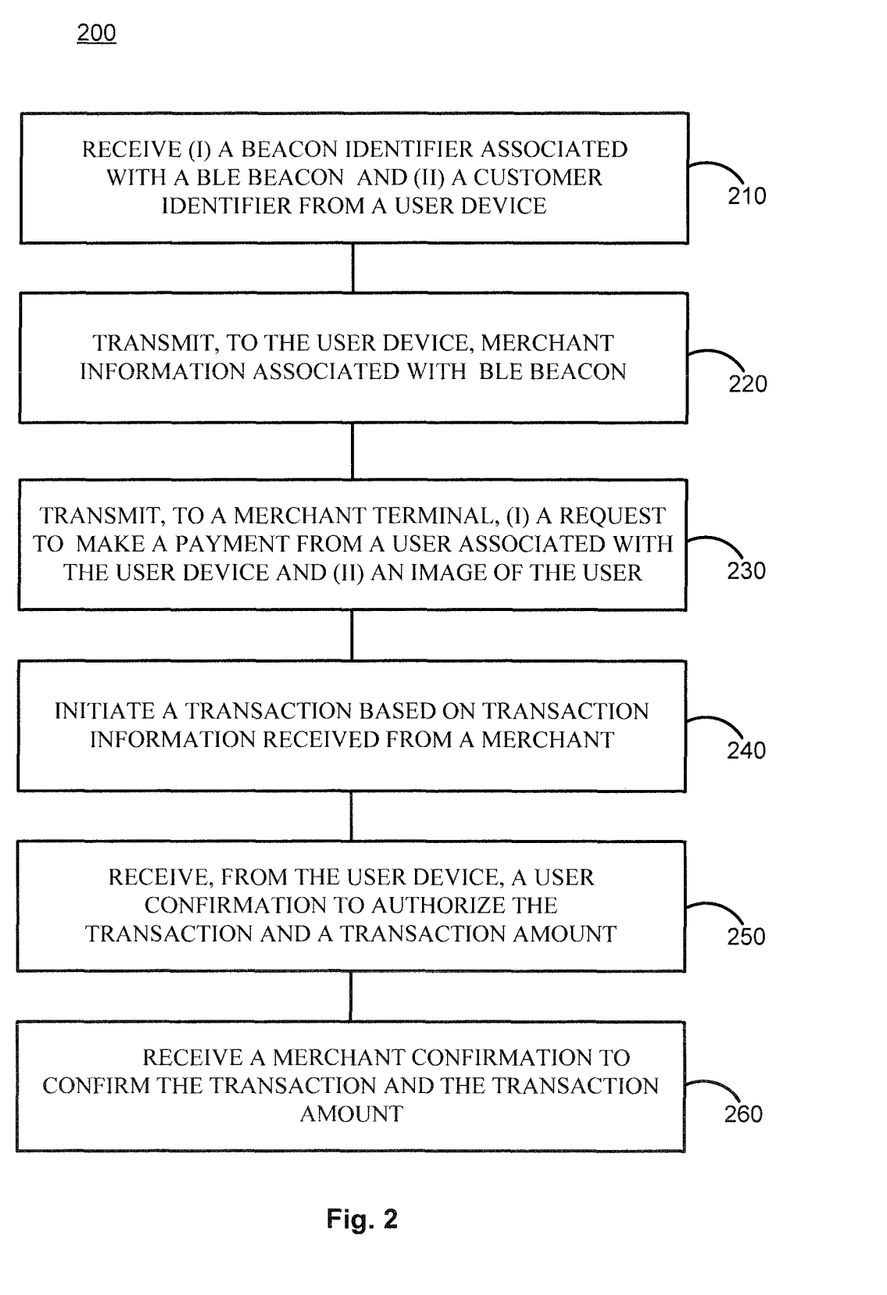
FIG. 2 is a process flow for operating a BLUETOOTH low energy mobile payment system, in accordance with various embodiments.

In various embodiments, and with reference to FIGS. 1A-1B and FIG. 2, user device 145 may be capable of capturing a beacon ID associated with BLE beacon 160 in transmission 165. User device 145 may be capable of providing the beacon ID to system 100. Moreover, user device 145 may be connected to system 100. System 100 may be configured to receive a beacon ID associated with the BLE beacon and a customer and/or user identifier from user device 145 (step 210).

In various embodiments, user device 145 and/or system 100 may be configured to analyze transmission 165 from BLE beacon 160. This analysis may allow user device 145 and/or system 100 to determine the distance between user device 145 and BLE beacon 160. This distance may also be correlated to and/or may inform system 100, user device 145, merchant terminal 155, and/or the merchant of the user's proximity to the merchant terminal based on the user's proximity to BLE beacon 160. The distance may be determined by the signal strength that an application operating on user device 145 receives from BLE beacon 160. This signal strength may be translated to a distance. If there is something between BLE beacon 160 and user device 145 (e.g., a casing unit around BLE beacon 160 where it is integrated into merchant terminal 155) the signal strength may be reduced. As such, the system 100 may be adapted to accommodate any potential interference. For example, in operation user device 145 may need to be a pre-defined distance from BLE beacon 160 to initiate a payment. User device 145 and/or the merchant app operating on user device 145 may be configured with and/or capable of determining that pre-defined distance. The pre-defined distance may be for example, any suitable distance between 0 cm and 30 cm Preferably, the predefined distance may be 0 cm to 20 cm More preferably, the predefined distance may be 0 cm to 10 cm Still more preferably, the predefined distance may be 0 cm to 5 cm.

In various embodiments, system 100 may transmit to user device 145 merchant information associated with BLE beacon 160. In this regard, system 100 may access a look-up table, micro-registry, and/or the like to determine the particular merchant location, payment terminal, micro-location, and/or the like associated with BLE beacon 160. The system 100 may quickly or substantially in real time, and in response to receiving the beacon ID and customer identifier, transmit merchant information to user device 145. Examples of a micro-registry and related systems may be found in, for example, U.S. patent application Ser. No. 14/454,452 filed on Aug. 7, 2014 and entitled "SYSTEM AND METHOD FOR PROVIDING A MICRO REGISTRY," which is incorporated herein by reference.

In various embodiments, user device 145 and/or merchant terminal 155 may be passive. User device 145 and/or merchant terminal 155 may be configured to receive "push" messages from system 100 and/or merchant terminal 155. In this regard, user device 145 and/or merchant terminal 155 may passively wait for system 100. For example, user device 145 may have an amount on it, and the user may add, adjust, and/or include a tip in the amount. User device 145 may then confirm payment with system 100. User device 145 may call and/or transmit a confirmation to system 100. System 100 may then find merchant terminal 155, and perform a "push" down to merchant terminal 155. In this regard, merchant terminal 155 is not polling the payment system 100 to see if it has any messages that require action by merchant terminal 155.

In various embodiments, and in substantially real time and/or concurrently with the transmission of the beacon of the merchant information to user device 145, system 100 may transmit to merchant terminal 155 a request to make a payment from a user associated with user device 145 and an image of the user (Step 230). In this regard, system 100 may be capable of and/or may facilitate identification of the user associated with user device 145 via merchant terminal 155. System 100 may be configured to provide any suitable particularly identifying information about the user. For example, system 100 may provide an image of the user, a physical description of the user, and/or any other suitable identifying information. In this regard, an associate working for a merchant (e.g., an employee) operating merchant terminal 155 may be capable of determining that user associated with user device 145 is sufficiently close to merchant terminal 155 to make a payment. Moreover, particularly identifying a user may allow a merchant associate to facilitate payment by a particular user where there are multiple users with multiple user devices 145.

In various embodiments, system 100 may receive transaction details and/or transaction information from merchant terminal 155. This information may include, for example, a transaction amount, one or more items associated with the transaction, and/or any other suitable information including merchant information, manufacturer information, item information, and/or the like. In response to receiving this transaction information from the merchant and/or merchant terminal 155, system 100 may initiate a transaction based on the transaction information received from a merchant (step 240).

In various embodiments, system 100 may receive from user device 145 a user confirmation to authorize the transaction and/or a transaction amount (Step 250). System 100 may be configured to transmit to user device 145, preliminary transaction information including a preliminary transaction amount. A user associated with user device 145 may be configured to modify that transaction amount and/or adjust that transaction amount to provide for example, a gratuity, a tip and/or the like. In this regard, the user may adjust the preliminary transaction amount to provide a transaction amount.

In various embodiments, system 100 may also receive a merchant confirmation to confirm the transaction and the transaction amount (Step 260). For example, system 100 may transmit to merchant terminal 155 the transaction amount as modified and/or confirmed by the user. System 100 may further request that the merchant confirm the modified and/or user confirmed transaction amount via merchant terminal 150. In this regard, the confirmation process may allow a merchant to distribute a tip and/or gratuity to a merchant associate (e.g., an employee) or otherwise maintain accurate records of the various transactions the merchant conducts.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) (iii) a digital channel, (iv) a service request, (v) a service host, and/or the like. Moreover, the associating may occur at any point, in response to any suitable action, event, or period of time. The associating may occur at pre-determined intervals, periodic, randomly, once, more than once, or in response to a suitable request or action.

Terms and phases similar to "consumer," "customer" "user" "account holder" "account affiliate" "cardmember," or the like shall include any person, entity, business, government organization, business, software, hardware, machine associated with a transaction account, that buys merchant offerings offered by one or more merchants using the account and/or that is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a biometric, and the like.

The system may include or interface with any of the foregoing accounts, devices, and/or a transponder and reader in BLE communication with the transponder (which may include a fob), or communications between an initiator and a target enabled by short range communications protocols. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SPSOO-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available e.g., Twofish, RSA, El Gama!, Schorr signature, DSA, PGP, PK.I, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments" "one embodiment" "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   determining, by a merchant terminal, a location of a wireless beacon associated with a merchant by extracting a beacon identifier from user information received from a user device, wherein the beacon identifier comprises identifying information about the wireless beacon with which the user device is in communication;
   determining, by the merchant terminal, that a user location of the user device, based upon the beacon identifier, is in proximity to the merchant terminal, wherein proximity is based upon a signal strength of a wireless connection between the user device and the merchant terminal;
   transmitting, by the merchant terminal, merchant information to the user device in proximity to the merchant terminal using the wireless connection;
   initiating, by the merchant terminal, a transaction between the merchant terminal and the user device based upon at least one of
   a transaction amount or one or more items associated with the transaction, in response to the user device in proximity to the merchant terminal generating a first transaction confirmation that is transmitted to at least one of a computing device associated with a card issuer or the merchant terminal, wherein the first transaction confirmation confirms the transaction amount associated with the transaction; and
   transmitting, by the merchant terminal, a second transaction confirmation to the computing device, wherein the second transaction confirmation confirms the transaction amount associated with the transaction.

2. The method of claim 1, wherein the user device automatically launches a merchant application.

3. The method of claim 2, wherein the merchant application displays instructions to conduct the transaction in response to being automatically launched.

4. The method of claim 2, wherein the merchant application activates a network connection between the user device and the merchant terminal.

5. The method of claim 1, wherein the merchant terminal receives the user information from the wireless beacon associated with a micro-location.

6. The method of claim 1, wherein the first transaction confirmation comprises an adjustment to the transaction amount made by a user.

7. The method of claim 6, wherein the second transaction confirmation approves the adjustment to the transaction amount made by the user.

8. A method comprising:
   obtaining, by a user device, a beacon identifier comprising identifying information about a wireless beacon with which the user device is in communication;
   transmitting, by a user device, user information to a merchant terminal, wherein the user information comprises identifying information about a user and the merchant terminal determines that a user location associated with the user device is in proximity to the merchant terminal based upon the beacon identifier, wherein proximity is based upon a signal strength of a wireless connection between the user device and the merchant terminal;
   receiving, by the user device, transaction details associated with a transaction between the merchant terminal and the user device; and
   initiating, by the user device, the transaction between the merchant terminal and the user device based upon the transaction details, in response to the proximity of the user device to the merchant terminal generating a first transaction confirmation that is sent to at least one of a computing device associated with a card issuer or the merchant terminal, wherein the merchant terminal generates a second transaction confirmation in response to receiving the first transaction confirmation.

9. The method of claim 8, wherein in response to receiving the merchant information from the merchant terminal, the user device automatically launches a merchant application.

10. The method of claim 9, wherein the merchant application displays instructions to conduct the transaction in response to being automatically launched.

11. The method of claim 9, wherein the merchant application activates a network connection between the user device and the merchant terminal.

12. The method of claim 8, wherein the merchant terminal receives the user information from a beacon device associated with a micro-location.

13. The method of claim 8, wherein the first transaction confirmation comprises an adjustment to a transaction amount made by the user.

14. The method of claim 13, wherein the second transaction confirmation approves the adjustment to the transaction amount made by the user.

15. A system comprising:
a merchant terminal comprising at least one processor; and
an application executable by the merchant terminal, the application causing the merchant terminal to at least:
determine a location of a wireless beacon associated with a merchant by extraction of a beacon identifier from user information received from a user device, wherein the beacon identifier comprises identification of information about the wireless beacon with which the user device is in communication;
determine that a user location of the user device, based upon the beacon identifier, is in proximity to the merchant terminal, wherein proximity is based upon a signal strength of a wireless connection between the user device and the merchant terminal;
transmit merchant information to the user device in proximity to the merchant terminal via the wireless connection;
initiate a transaction between the merchant terminal and the user device based upon at least one of
a transaction amount or one or more items associated with the transaction, in response to the user device in proximity to the merchant terminal generate a first transaction confirmation that is transmitted to at least one of a computing device associated with a card issuer or the merchant terminal, wherein the first transaction confirmation confirms the transaction amount associated with the transaction; and
transmit a second transaction confirmation to the computing device, wherein the second transaction confirmation confirms the transaction amount associated with the transaction.

16. The system of claim 15, wherein the user device automatically launches a merchant application.

17. The system of claim 16, wherein the merchant application displays instructions to conduct the transaction in response to being automatically launched.

18. The system of claim 16, wherein the merchant application activates a network connection between the user device and the merchant terminal.

19. The system of claim 15, wherein the merchant terminal receives the user information from the wireless beacon associated with a micro-location.

20. The system of claim 15, wherein the first transaction confirmation comprises an adjustment to the transaction amount made by a user.

* * * * *